Sept. 9, 1969  J. E. KOSTUR  3,466,355
METHOD OF MAKING HEAT FORMED ARTICLE
Original Filed Oct. 25, 1963  3 Sheets-Sheet 1
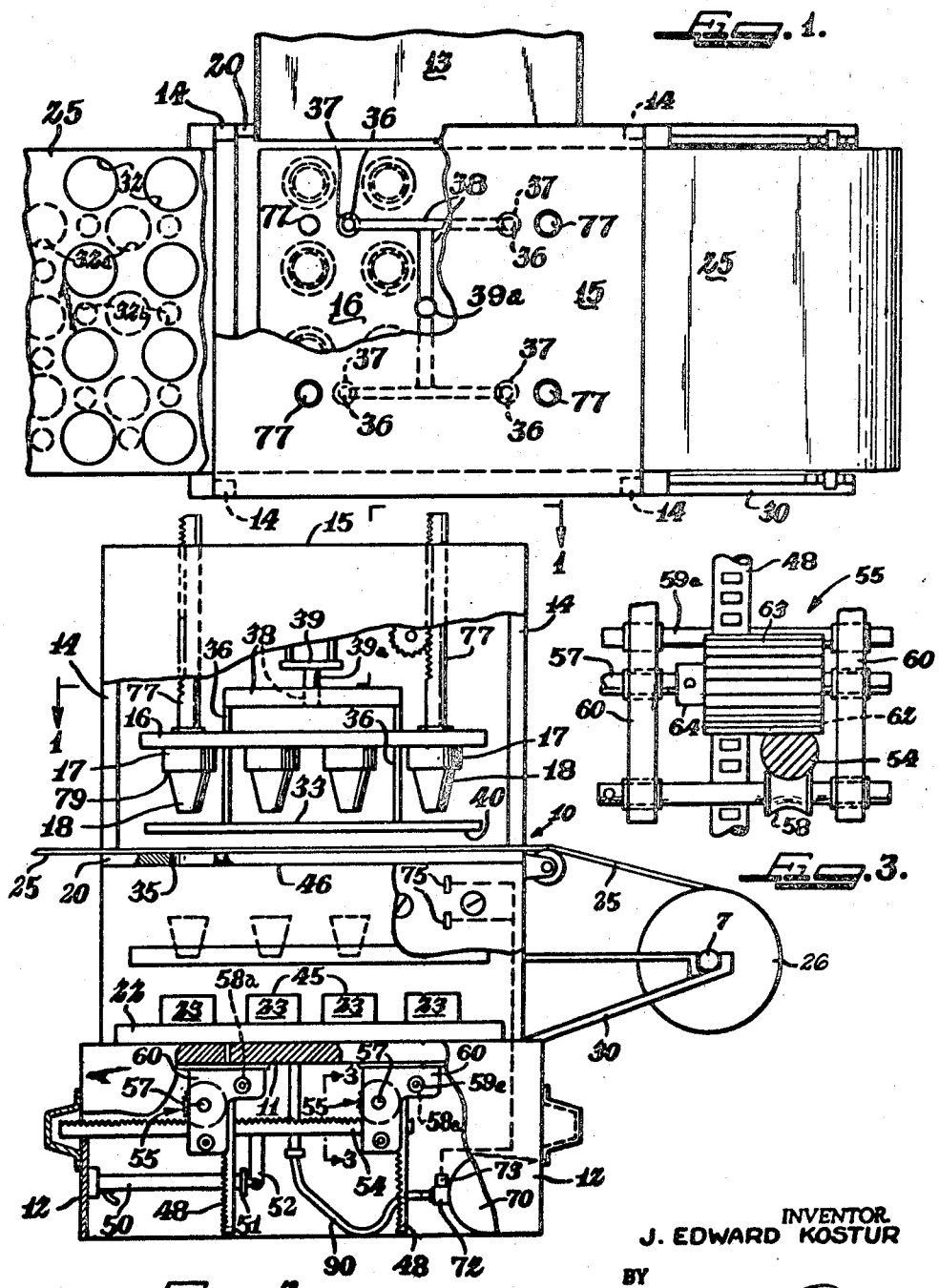
INVENTOR.
J. EDWARD KOSTUR Sept. 9, 1969  J. E. KOSTUR  3,466,355
METHOD OF MAKING HEAT FORMED ARTICLE
Original Filed Oct. 25, 1963  3 Sheets-Sheet 2
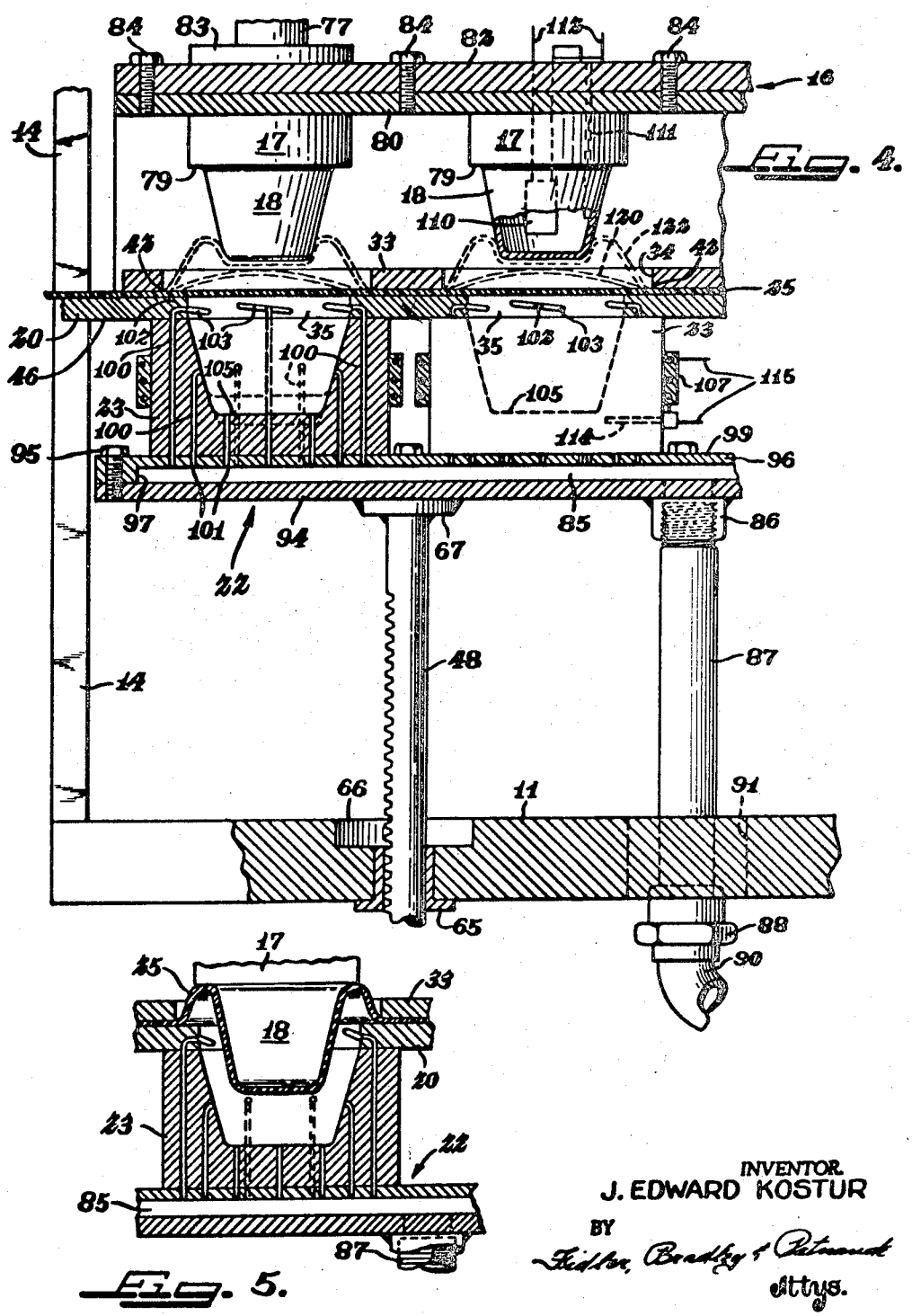
INVENTOR.
J. EDWARD KOSTUR
BY
Fidler, Bradley & Patnaud
Attys.

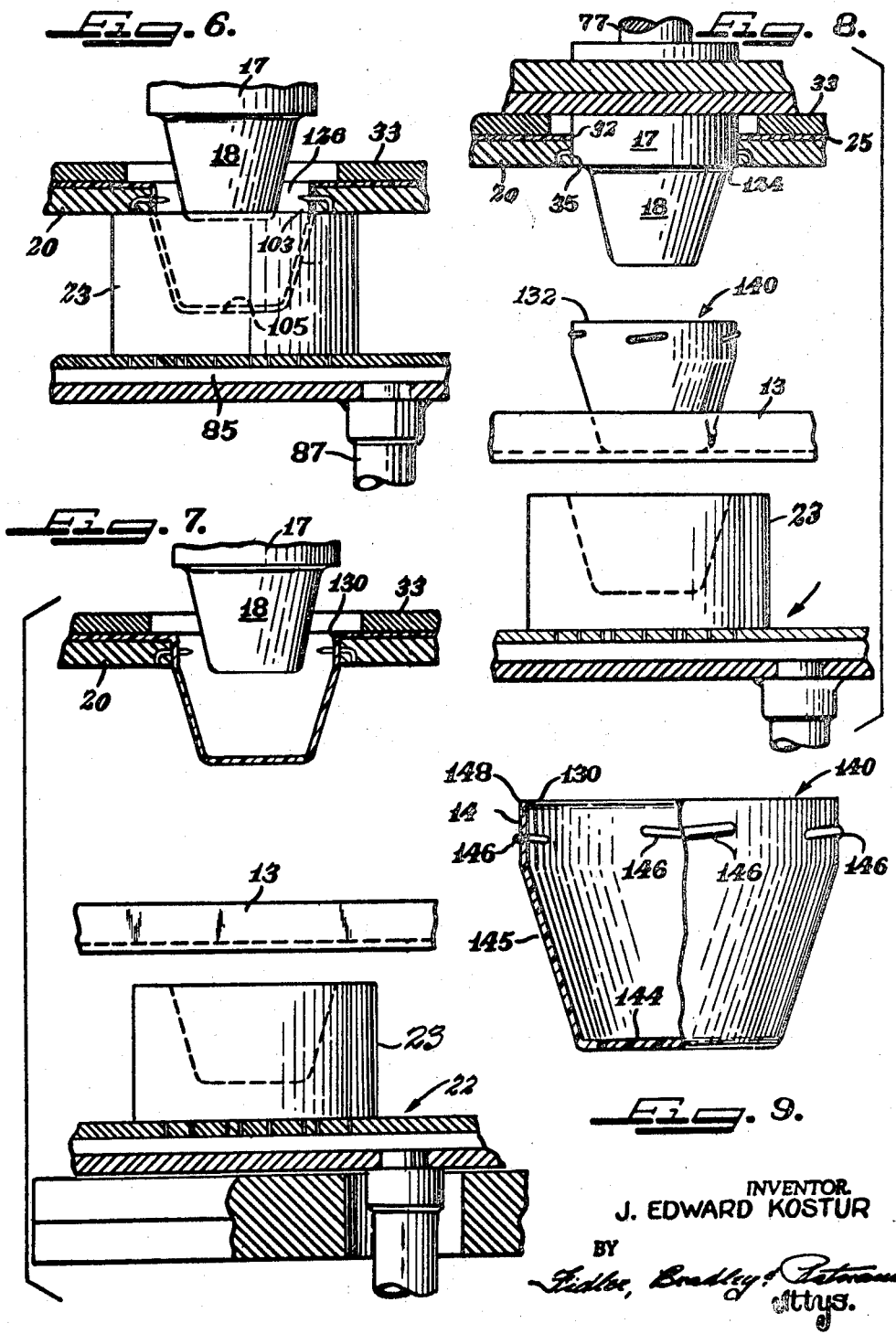

United States Patent Office 3,466,355
Patented Sept. 9, 1969

3,466,355
METHOD OF MAKING HEAT FORMED ARTICLE
J. Edward Kostur, Elmhurst, Ill., assignor to Comet Industries, Inc., Bensenville, Du Page County, Ill., a corporation of Illinois
Continuation of application Ser. No. 539,592, Jan. 6, 1966, and a division of application Ser. No. 318,888, Oct. 25, 1963, now Patent No. 3,268,521. This application Jan. 8, 1968, Ser. No. 697,243
Int. Cl. B29c 5/06, 17/04
U.S. Cl. 264—89         4 Claims

ABSTRACT OF THE DISCLOSURE

The female die has a shearing edge, and beneath the shearing edge, grooves for forming partial screw-threads. A heated matrix is positioned on one side of the female die and a heated patrix on the other, the plastic to be formed being clamped against the die. The plastic is heated and caused to billow against the patrix by fluid pressure from the matrix prior to being drawn within the matrix by reversal of the pressure. The patrix is inserted into the die and moved against the shearing edge to blank out the article. As the article is removed it bends so that the partial threads are pulled free from the grooves.

---

This application is a continuation of application Ser. No. 539,592, filed Jan. 6, 1966, now abandoned, and a division of application Ser. No. 318,888, filed Oct. 25, 1963 By J. Edward Kostur, now U.S. Letters Patent No. 3,268,521.

The present invention relates to a method for making articles out of heat-formable plastic material and more particularly to the making of relatively deeply formed articles; and/or still more particularly to making articles having external threads adjacent an opening thereof.

The invention is characterized in that the material to be formed into finished articles is first clamped between die parts. A female die part has grooves for forming external protuberances, such as screw-threads, and also provides a shearing edge for blanking out a finished article. A patrix and a matrix are moved adjacent the material between the die parts. The material is heated and caused to billow into engagement with the patrix and to stretch and mold thereupon, and thereafter, the material is drawn away from the patrix by reversal of effective pressure acting thereupon and into molding engagement with the matrix in well known manner. After molding in the matrix, the latter is withdrawn from the article, and the article is blanked out of the material as a final step of forming. After the material is blanked out, the article is removed from the machine. The finished article thus formed is smooth vertically and free of seams that appear upon articles made with split female dies.

Accordingly, it is a broad object of this invention to provide a new method for making articles out of heated-formable plastic materials.

A further object, in keeping with the preceding object, is to make a finished article while moving a male forming member in one sense of movement.

Another object, in keeping with the preceding object is to remove the article from the machine by the movement of the male forming member in the one sense of movement.

Another object, in keeping with the above objects, is to provide the material adjacent the opening with screw-threaded portions, or the like, during the molding of the article to finished peripheral shape.

The foregoing and other objects and advantages of the method will be either obvious or pointed out in the following specification and claims read in view of the accompanying drawings; in which:

FIGURE 1 is a diagrammatic plan view with parts broken away substantially along line 1—1 of FIG. 2 to show internal structural arrangement of the machine;
FIG. 2 is a front elevational view with front panel parts broken away to show internal parts;
FIG. 3 is a sectional view taken substantially on lines 3—3 of FIG. 2;
FIG. 4 is a sectional view taken substantially on lines 4—4 of FIG. 1;
FIG. 5 is a detail view showing an article forming step;
FIGS. 6, 7 and 8 are detail views with parts and material being formed in different positions in further article-forming steps; and
FIG. 9 is an enlarged side view with one-half in section of a finished article made by the machine and method.

The present invention is adapted to form articles in which it is desirable to have a relatively thick-walled edge adjacent an opening thereof. The machine heats material in localized areas for stretching same substantially adjacent the deep-formed center of an article; and heats the edge forming the edge of the opening the least prior to deep-forming the article. The finished article is blanked-out of the prime sheet stock; and additional articles can be formed from the remaining stock. The localized heat will not deteriorate the qualities of most prime stock for use of unblanked portions thereof for other articles to use stock most advantageously. Present machines and methods do not essentially provide such feature.

MACHINE

Referring now in detail to the drawings, and first to FIGS. 1 and 2; the reference character 10 indicates a molding machine especially adapted to perform the method of this invention. The molding machine 10 comprises a platen 11 mounted on suitable supports such as side plates 12 forming a base for the machine 10. Corner posts 14, or the like, extend upwardly from the platen 11 and in turn support a top plate 15. The top plate 15 supports suitable power-operative mechanism for driving an upper subplaten 16 up and down to position male dies 17 and patrixes 18 with respect to a female die 20, also supported by the posts 14 as by suitable plates or brackets, not shown.

A lower subplaten 22 carries matrixes 23 which move up and down with respect to the female die 20. As will be pointed out more fully below, the matrixes 23 perform a conjoint molding function with the female die 20 for forming a new article of manufacture. The articles are formed from a sheet of thermoplastic material 25 which may be carried in roll form 26 upon a rotatable axle 27 carried in a suitably journalled yoke 29 secured at the end of extending bracket arms 30 in turn supported by the corner posts 14 at the right-hand side of the machine. It is understood that the sheet material 25 could be in the form of boards pre-cut to fit within the bed of the machine upon the female die 20, and in keeping with the spirit of this invention.

As illustrated in FIGS. 1 and 2, the material 25 is fed from the roll 26 toward the left across the top of the female die and it is stopped during the time of the forming operation to be described more in detail hereinbelow. The sheet 25, after forming, moves to the left and in producing the article to be described below has a plurality of holes 32 blanked-out of the sheet 25. The holes 32 are spaced suitably so that a clamping plate 33 can securely hold the sheet material 25 adjacent female die holes 35 in the female die 20. The material not blanked out of the sheet 25 may be used for forming other shaped or smaller articles from blanks 32a and 32b, or the like, at later stations in the same machine or other machines, not shown. Finished articles, after each forming operation, are removed from the machine by suitable means, such as a movable tray 13, or the like.

The clamp 33 is carried on thrust rods 36 suitably spaced to supply proper force for securing the plastic sheet 25 in engagement with the female die 20. The thrust rods 36 pass through holes 37 in the upper subplaten 16, and are driven by an H-frame 38 by suitable motor means above the subplaten 16 such as a hydraulic stroke motor 39 driving a shaft 39a, for example, and not to be construed in a limiting sense. The motor 39 can be suitably secured at its other end, not shown, to the upper plate 15, or suitable structural members associated with the corner posts 14 to drive the frame 38 downward from the position shown so that the bottom surface 40 of the clamping plate 33 will engage the upper surface of the material 25 to urge the bottom surface thereof into engagement firmly with the upper surface of the female die 20, particularly adjacent the holes 35 in the die 20. Although not shown, it is a practice with certain dies to tack-weld an annular ring or the like to the bottom surface 40 of the clamp 33, which rings will surround the material clamped over the holes 35 in the die 20 and present a well-rounded edged surface to the material 25. The clamping member itself may be chamfered at the internal edge 42 of the holes 34 in the clamp 33 for preventing edge stresses on the material 25 engaged by the clamp 33 instead of using rings, as shown in FIG. 4.

The lower subplaten 22 is constructed as arranged to move the matrixes 23 upwardly until the top surfaces 45 thereof engage portions of the bottom surface 46 of the female die 20 and to form a substantially air-tight seal therewith. The subplaten 22 is moved, in the present arrangement, FIG. 1, by rack-bars 48 under the influence of a stroke motor 50 which moves a thrust rod 51 to the right from the position shown. The thrust rod 51 is connected with a bracket 52 secured to a rack 54 which turns pinion mechanisms 55 which in turn drive the rack-bars 48 upwardly. The rack 54 is cooperatively associated with each of the pinion mechanisms 55 so that each are driven simultaneously. The pinion mechanisms 55 are connected through shafts 57 to drive two corresponding pinion mechanisms 55 spaced on the back side of the machine, not shown. Accordingly, four rack-bars 48 may be moved upwardly and downwardly at identical rates of movement by operation of the stroke motor 50 toward the right or left, respectively. When the machine is arranged vertically as shown, the downward movement of the subplaten 22 can be effected by a force of gravity. However, if the machine is placed on its side substantially as shown in the position in FIG. 1, with FIG. 1 becoming an elevational view, the stroke motor 50 is preferably of the double-acting type whereby it can be driven by fluid pressure in both directions.

For details of the rack-driven pinion mechanism 55, reference is made to FIG. 3. The rack 54 is guided over a bearing roll 58 mounted on a pin 59 secured between depending bracket side plates 60 in turn secured to the underside of the platen 11, FIG. 2. The rack 54 has an elongate row of teeth 62, which teeth engage a pinion 63 secured as by a pin 64 to the shaft 57 to rotate the same. The rack-bar 48 is secured by a roll similar to 58, not shown in FIG. 3, but indicated at 58a, FIG. 2, on a shaft 59a to constrain the rack-bar 48 to move upwardly upon horizontal movement of the rack 54 toward the right. Each rack-bar 48 is guided in a pressed-in bushing 65 secured in the platen 11, FIG. 4. A recess 66 is provided in the top surface of the platen 11 to provide clearance for fastening plates 67 secured to the bottom of the platen 22, FIG. 4. If different rates of movement are desired, the pinion 63 can have two tooth diameters (not shown) to afford differential rack-bar 48 movement with respect to rack 54 movement.

A control panel 69 is suitably mounted adjacent the forming operation area of the machine so that an operator may cause plastic sheet stop 25 to be moved into the machine 10 and further to cause operations of the various steps in the method of forming articles of manufacture to be described more in detail hereinbelow. A source of air under pressure is indicated at 70 in the form of a portion of a tank. There is also a source of air at less than atmospheric pressure, or vacuum, not shown, and both may be arranged to be controlled by a switch-over valve 72 controlled by one or more solenoids 73 in turn controlled by one or more switches 75 mounted on panel 69. It is to be understood that automatic equipment can be arranged in the machine and controlled at the panel 69 with timers and the like for controlling molding operations and article-forming. However, it is preferred that there be suitable manual controls for the several steps of operation so that the machine can be set up for a run by establishing a program by operating at least the first few operations when forming an article to determine the most practicable time for each step and hence a complete forming operation. The panel 69 may contain timers, pressure indicators, temperature indicators, as well as adjustable fittings for an automatic programming cycle. Inasmuch as such equipment is presently known and used in the art, the same has not been disclosed even though the process to be disilosed hereinafter deviates substantially from many practiced methods. It is to be understood that the control mechanism is well known as will appear more fully as the description proceeds hereinbelow concerning the method of treating, handling and constraining sheet materials to form articles of manufacture.

The upper subplaten 16 carries the male dies 17 and the patrixes 18 are moved by rack-bars 77 that may be identical to the rack bars 48 and of suitable length and operative through rack and pinion mechanisms 55' substantially identical to that described above, FIG. 3, and primed reference characters indicate similar parts. A horizontally movable stroke motor may be suitably connected to the rack-bars 77 through pinion mechanisms 55 so that horizontal movement of a rack controlled by a stroke motor, not shown, secured to the top plate 15, or other suitable securement associated with corner posts 14, may move the subplaten 16 upwardly and downwardly. As will appear below, the upper platen 16 has a position, such as indicated in FIG. 2, away from the upper surface of the female die 20. The platen 16 is moved downwardly to predetermined extents in steps which may be controlled by limit switches, or the like, not shown, to position each patrix 18 in predetermined positions relative to the sheet of material 25 for performing steps in the process of manufacture of articles. The male die parts 17 can be moved down in a final step of operation and cutting edge surfaces 79 cooperable with the cutting edge surfaces 35 of the female die 20 will blank out a finished article in a manner to be described below. These cutting edge surfaces are preferably formed of hardened steel to provide long die life.

Referring now to FIG. 4, the subplaten 16 is shown moved from the position indicated in FIG. 2 down to a position in which one article of manufacture may be molded. It is to be noted that the subplaten 16 is made up of a lower part 80 and an upper part 82 which is in turn secured by plates 83 to the rack-bars 77. The plates 80 and 82 may be secured together by suitable machine screws 84 and positioned by conventional locating-pins, not shown, and such assembly affords changing plates 80 containing male die parts 17 and patrixes 18 of different shapes or sizes of articles that may be formed.

The subplaten 22 is also made up of two or more parts to facilitate forming different sized and shaped parts and further to provide a pressure and vacuum chamber 85 which communicates through a suitable connection, such as a half coupling 86, securing a pipe 87. The pipe 87 is secured to a cable connector 88 connected with a flexible pressure and vacuum tube 90, FIG. 2. The tube 90 leads to a suitable connection on the switch control changeover valve 72, FIG. 2, to selectively connect the chamber 85 with either a source of air under pressure in tank 70, or a source of air at less than atmospheric pressure (partial vacuum). A suitably large hole 91 is provided in the platen 11 so that the pipe 87 and the coupling 88 can pass freely therethrough for accommodating different strokes of movement of the subplaten 22 under the influence of rack bar 48, in the manner of the mechanism, or the like, explained above.

The subplaten 22 has a bottom part 94 connected as by suitably spaced bolts 95 and locating pins (not shown) to an upper part 96 which has a shoulder or suitable spacer 97 to provide the space 85 of sufficient clearance between the surfaces of the parts 94 and 96 to provide substantially instantaneous flow of air in either direction to and from all of the matrixes 23.

The matrixes 23 are suitably secured to the upper surface 99 of the plate 96 as by locating pins and bolts, or the like, not shown, and suitable holes 100 are drilled in the matrixes 23 which communicate with holes 101 in the top plate 96 of the subplaten 22. Certain of the holes 100 further communicate with holes 102 in communication with grooves 103 on the internal curved surfaces of the holes 35 in the female die 20. As shown, the grooves 103 are sloped in a manner to form external right-hand screw-threaded portions on the article to be molded when the material 25 has been drawn down into the matrixes 23 as by the application of lower than atmospheric pressure whereby atmospheric ambient pressure air will drive the material downwardly into the cavity of the matrix cavity 105 of the matrixes 23 and into the grooves 103 in the female die 20.

The matrixes 23 are preferably made of aluminum and may have embedded internal or external heating elements 107 associated therewith for maintaining the cavity surface 105 at approximately 150° F. At such temperature, heated plastic material 25 will be drawn by sub-atmospheric pressurized air into intimate contact with the cavity 105 and the internal surface of the hole 35 in the female die 20 having grooves 103, or the like. Accordingly, the heated material will be drawn into the grooves 103 to form partial screw threads. Because the temperature of the female die temperature 20 adjacent the holes 35 is less than the temperature of the matrix, that is, 150° F., the plastic material will set more quickly than other portions of the article to be formed within the cavity 105 of the matrix and accordingly a thicker wall is provided in the plastic material adjacent the interior surfaces 35 of the holes in the matrix 20.

The patrixes 18 are also heated as by electric heating elements 110 secured therewithin preferably, and the patrixes are preferably heated to substantially 210° F. Suitable heating of plastics used in the machine may be accomplished at temperatures somewhat below 210° F., and certain plastics can be suitably formed at temperatures as high as 250° F. However, for most operations of the machine, the heaters 110 are adapted to heat the patrixes to substantially 210° F., and such temperatures are controlled by thermostat 111 controlling the power supply 112 to the heaters 110. Likewise, a thermostat 114 controls the source of power 115 for maintaining the inside surfaces of the matrixes at substantially 150° F., which again is a temperature used by way of example only and may be varied depending upon the physical characteristics of the materials to be molded, as well as upon the shape of the mold to conform the finished article to a predetermined shape.

METHOD

With the parts including the plastic 25 in the position shown in full lines in FIG. 4, the tube 90 is connected with a source of fluid above atmospheric pressure which will be fed through the pipe 87, the cavity 85 and into the holes 100 within the matrix 23 and also to holes 102 communicating with the grooves 103 in the female die 20. Air pressure may be applied after the heat radiated from the bottom surfaces of a patrix 18 and the internal surfaces of a matrix 23 have softened the material 25 overlying the female die openings sufficiently to place same in a plastic flow temperature range. Inasmuch as the patrix 18 illustrated is adjacent the center line of the cavity 105 of the matrix 23, the center portion of the plastic intercepting this center line will be heated to the highest temperature initially with the material 25 positioned as shown in solid lines.

Upon application of air pressure in the matrixes 23, material will rise to a dotted line position 120 in which it first will engage the entire bottom surface of the patrixes 18. Due to friction with the patrixes, the contacted surfaces will tend thereafter to flow less at the bottom, but upon additional air supply beneath the material 25 the same will billow upwardly substantially to an intermediate broken line position 122; and thereafter still further to engage and stretch along the bottom sides of the patrixes adjacent the bottom surfaces thereof. The rate of billow-in can be controlled by the application of pressurized air from the source 70, FIG. 2, to the chamber 85. It is to be noted that the material adjacent the edges 34 of the holes in the clamping plate 33, which is normally cool, will be the least effected by heating of the patrix and only nominally effected by heating of the matrix 23 which conducts heat into the female die 20 adjacent the holes 35 therein.

When the material 25 has gone through a plastic flow and heating step, the patrix 18 is moved to a suitable lower position, such as the position shown in FIG. 5. The bottom side of the male die 17 may contact the material 25 at a shoulder 124 at this time to define the limits of billowing by the material 25. Suitable, sensitive indicators, or switches, not shown, can be incorporated, if desired, to indicate and/or control the limit of billowing. In the position of FIG. 5, the suuply of pressurized air may be discontinued through the pipe 87 into the chamber 85 and a pause may occur while the plastic material 25 absorbs heat in forming some articles. In case the depth of the article is to be deeper than shown, or if the body of the article formed in the matrixes 23 is to obtain a bottle shape, or the like, with a relatively narrow inlet, this heating time may be longer than for relatively shallower and wider mouthed articles, such as illustrated herein, and requires less heat usually.

Referring to FIG. 6, the direction of air flow in the pipe 87 is reversed to bring the pressure in the chamber 85 below atmospheric pressure. The material 25 will be drawn intimately into engagement with the cavity 105 in the matrix 23 and also into the grooves 103 in the female die 20. Because the temperature of the matrix 23 (at 150° F.) and the edge of the female die (at a slightly lower temperature) is below the plastic flow range of the plastic material 25, the same will harden in the position 126 shown in FIG. 6. It is to be noted in this position further that radiant heat from the patrix 18 can be transferred directly through a short gap 126 to the material adjacent the grooves 103 to further effect plastic flow of the material 25 into the grooves 103 while not substantially altering the thickness of the material because there is substantially no tendency in this position for the material 25 to stretch other than that stretching caused by material entering the grooves 103.

For certain articles, it may be desirable that the heat supply to the patrix 18 at this time be turned off after a predetermined short time to permit chilling of the material due to the temperature of the female die 20. In other cases, the patrix may be cooled, as by an internal or external air blast or the like, to increase hardening rate of the material 25.

Referring to FIG. 7, the matrix 23 is shown in the lower position. For preventing expenditure of either pressurized or vacuum air, the valves 72 are shut off at this time. The movable trays 13 can be moved between the extended material 25 and the top of the matrix 23. The material 25 will have been drawn to form a circular edge 130 of smoothly rounded shape in cross-section due to the tension placed upon the material 25 during the molding process which occurred in the position of the material shown in FIG. 6.

Referring to FIG. 8, the subplaten 16 is shown as having been moved down by movement of the rack-bar 77. The shoulder 124 of the male die 17 has cooperated with the upper edge of the hole 35 in the female die 20. Accordingly, the upper surface 132 of the material 25 will have been sheared and blanked out of the material 25, leaving the blank hole 32 therein. The article 140 formed in the machine by the method hereinabove outlined will be forced out of the female die 20 and dropped by gravity into the tray 13. If the machine is not mounted for operation of parts vertically, the movable tray 13 will not necessarily be required, and the parts may be caused to drop by gravity into a suitable receptacle, not shown. All parts in the receptacle or movable tray 13 are removed from between the matrix 23 and the female die 20, and the patrix 18 is returned to the position shown in FIG. 2 for the beginning of another article forming operation.

ARTICLE

Referring now to FIG. 9, the article 140 is shown half externally and half in section. The article 140 is shown having a relatively thick upper rim 142, a less thick bottom 144 and thinner side wall 145, such as may be formed by the method hereinabove described by suitably heat controlling and positioning the patrixes 18. Four partial threads 126 are shown as portions molded externally of the rim 142. The edge of the rim 142, on the inner side 130 thereof, will be smoothly rounded because of the tensioning of the material 25 from which it is formed as pointed out hereinabove in connection with FIG. 7. The outer corner 148 will tend to be relatively sharp due to having been blanked out of the sheet 25 in the operation explained in connection with FIG. 8. However, because of plastic recovery of the material, this edge need not be sharp enough to be uncomfortable to feel by the fingers, of a user. This is an additional attribute of this method, particularly when the jars, or the like, are to be used as cosmetic containers or where same are designed to be washed and wiped in common dishwashing operations.

While I have shown and described in detail a presently preferred embodiment of a machine and method for forming new articles of manufacture, obviously modifications of the machine method and article will occur to others working in the art. Accordingly, I wish not to be limited in the invention only to the particular embodiment of the invention shown and described.

What is claimed is:
1. A method of forming an article having a tubular body portion with a threaded end portion, comprising the steps of:
providing a first mold matrix having a plurality of angularly disposed, spaced apart undercut recesses in the wall thereof for forming the entire threaded end portion of said article,
providing a second mold matrix mating with said first mold matrix to form the remaining portion of said article,
heating a sheet of thermoplastic material and controlling the temperature thereof such that the temperature of the sheet near the center of the matrixes is greater than the temperature of the sheet near said undercut recesses in the wall of said first mold matrix, whereby the threaded end portion of said article is stretched to a lesser degree so as to be thicker near said threaded portion, and applying a fluid pressure differential across said material to force it into both said matrixes against the walls thereof to form said article,
moving said second mold matrix away from said first mold matrix and away from said article, and
moving a cutting die against said sheet and into said first mold matrix to first cut said article from said sheet so that said article is free to flex and turn relative to said first mold matrix and then to push said article through and out of said first mold matrix,
whereby said threaded portion of said article does not include a parting line.

2. The method of claim 1 further providing a patrix which contacts the sheet during the heating step; in which said matrixes and said patrix are heated for heating said sheet to a plastic moldable condition, said patrix being heated to a higher temperature than said matrixes whereby the portion of said sheet immediately adjacent to said patrix is heated to a temperature higher than the remainder of said sheet whereby the threaded end portion is stretched less than the portion drawn further into said matrixes by said fluid pressure.

3. The method of claim 1 further providing a patrix which contacts the sheet during the heating step including the step of heating said patrix and, before forcing said heated sheet into said matrixes, moving a portion of the heated sheet against said patrix by fluid pressure prior to forcing said sheet against the walls of said matrixes.

4. A method of forming an article having a generally tubular end portion with transverse protuberances extending therefrom, comprising the steps of providing a first mold matrix having a hole therethrough and further having a plurality of angularly disposed, spaced apart undercut recesses in the wall defining said hole for forming the entire protuberances on the end portion of said article, providing a second mold matrix mating with said first mold matrix to form the main body portion of said article, heating a sheet of thermoplastic material and applying a fluid differential pressure across said material to force it against the walls of both said matrixes to form said article, moving said second mold matrix away from said first mold matrix and away from said article, and moving a cutting die against said sheet and into said first mold matrix to first cut said article from said sheet so that said article is free to flex relative to said first mold matrix and then to push said article through and out of said first mold matrix, whereby said protuberances on the end portion of said article do not include a parting line.

References Cited

UNITED STATES PATENTS

| | | | |
|---|---|---|---|
| 3,016,579 | 1/1962 | Schlitzkus | 18—59 |
| 3,121,916 | 2/1964 | Edwards | 18—19 |
| 3,159,695 | 12/1964 | Behringer | 264—93 |
| 3,167,104 | 1/1965 | Wiley | 150—0.5 |
| 3,290,418 | 12/1966 | Best | 264—92 |

FOREIGN PATENTS 648,521 11/1962 Italy.

ROBERT F. WHITE, Primary Examiner
R. R. KUCIA, Assistant Examiner

U.S. Cl. X.R.

264—163, 316, 318, 334

UNITED STATES PATENT OFFICE
CERTIFICATE OF CORRECTION

Patent No. 3,466,355September 9, 196

J Edward Kostur

It is certified that error appears in the above identified patent and that said Letters Patent are hereby corrected as shown below:

Column 4, line 27, "disilosed" should read -- disclosed -  Column 6, lines 21 and 22, "billowin" should read -- billowing --; line 38, "suuply" should read -- supply --. Column 7, lin 33, "126" should read -- 146 --. Column 8, line 41, after "material" insert -- and controlling the temperature thereof such that the temperature of the sheet near the center of the matrixes is greater than the temperature of the sheet near sai undercut recesses in the wall of said first mold matrix, wheret the threaded end portion of said article is stretched to a less degree so as to be thicker near said threaded portion, --.

Signed and sealed this 27th day of October 1970.

(SEAL)
Attest:

EDWARD M. FLETCHER, JR.
Attesting Officer

WILLIAM E. SCHUYLER, JR
Commissioner of Patents